127,814

UNITED STATES PATENT OFFICE.

JOSEPH WALTON, OF NEWARK, OHIO.

IMPROVEMENT IN MEDICAL COMPOUNDS AND DISINFECTANTS.

Specification forming part of Letters Patent No. 127,814, dated June 11, 1872.

Specification describing a new and Improved Medical Compound, invented by JOSEPH WALTON, M. D., of Newark, in the county of Licking and State of Ohio.

My invention has for its object to furnish an improved medical compound for driving away mosquitos, flies, fleas, roaches, and other bugs from the person, house, office, store, &c.; as a disinfectant and preventive, especially in cases of cholera, small-pox, &c.; as a lotion for inflammatory rheumatism, frozen limbs, the itch, &c.; for cleaning ulcers and old sores; for sprains, bruises, &c.; and as a wash for fruit-trees to keep off the borers, and for other uses; and it consists in the compound prepared of the ingredients, in the proportion and manner, as hereinafter more fully described.

The compound is composed of the ingredients and in the proportions as follows: Camphor, one ounce; carbolic acid, twelve ounces; aqua ammonia, ten drams; salt soft-water, eight drams.

The compound is prepared as follows: The camphor is dissolved in the carbolic acid in a closed decanter or other suitable vessel; then take one quart of rain water, boil it over a slow fire, and add one pint of dry common salt slowly until dissolved. The solution is then skimmed and set to cool. When cold the solution is added to the carbolic acid and camphor, after which the aqua ammonia is added. The compound is then thoroughly shaken. The bottle must be kept tightly corked.

Having thus described my invention, I claim as new, and desire to secure by Letters Patent—

An improved compound, prepared of the ingredients, in the proportions and manner substantially as herein described and set forth.

JOSEPH WALTON.

Witnesses:
JAMES W. OWENS,
JAS. F. LINGAFELTER.